US011394781B1

(12) United States Patent
Jacob Da Silva et al.

(10) Patent No.: US 11,394,781 B1
(45) Date of Patent: Jul. 19, 2022

(54) SERVICING STORAGE REQUESTS USING AN OPTIMAL PATH IN A COMPOSITE CLOUD ENVIRONMENT

(71) Applicant: Lenovo (Singapore) PTE. LTD., New Tech Park (SG)

(72) Inventors: Roberto H Jacob Da Silva, Oak Park, CA (US); Corneliu-ilie Calciu, Bucharest (RO); Radu Iorga, Bucharest (RO); Miroslav Halas, Chapel Hill, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/336,051

(22) Filed: Jun. 1, 2021

(51) Int. Cl.
*G06F 15/173* (2006.01)
*H04L 67/1097* (2022.01)
*H04L 61/2517* (2022.01)
*H04L 45/24* (2022.01)
*H04L 61/5007* (2022.01)
*H04L 101/622* (2022.01)

(52) U.S. Cl.
CPC ........ *H04L 67/1097* (2013.01); *H04L 45/245* (2013.01); *H04L 61/2517* (2013.01); *H04L 61/5007* (2022.05); *H04L 2101/622* (2022.05)

(58) Field of Classification Search
CPC ............... H04L 67/1097; H04L 45/245; H04L 61/2007; H04L 61/2517; H04L 61/6022
USPC ................. 709/223, 224, 226, 245
See application file for complete search history.

(56) References Cited

U.S. PATENT DOCUMENTS

| 6,633,962 | B1* | 10/2003 | Burton | G06F 21/805 |
| | | | | 711/170 |
| 7,020,796 | B1* | 3/2006 | Ennis | H04L 1/22 |
| | | | | 714/4.1 |
| 8,787,149 | B1* | 7/2014 | Ramanathan | H04L 45/66 |
| | | | | 370/216 |
| 9,942,144 | B1* | 4/2018 | Ramalingam | H04L 45/745 |
| 10,855,351 | B1* | 12/2020 | Tsai | H04B 7/063 |
| 2008/0259788 | A1* | 10/2008 | Wang | H04W 40/24 |
| | | | | 370/328 |
| 2010/0262772 | A1* | 10/2010 | Mazina | G06F 3/0613 |
| | | | | 711/114 |
| 2010/0325257 | A1* | 12/2010 | Goel | H04L 61/103 |
| | | | | 709/223 |
| 2012/0033672 | A1* | 2/2012 | Page | H04L 49/552 |
| | | | | 370/395.53 |

(Continued)

*Primary Examiner* — Liang Che A Wang
(74) *Attorney, Agent, or Firm* — Kunzler Bean & Adamson; Bruce R. Needham

(57) ABSTRACT

A method includes identifying, for each port of a storage controller, an optimal path between a port of the storage controller to a computer and identifying a port of the computer connected to the optimal path. Two or more interconnected switches connect the computer and the storage controller. The method includes assigning a static IP address to each port of the storage controller, and transmitting to the computer, for each port of the storage controller, a static MAC address of a port of the storage controller and the corresponding port of the computer that is part of the optimal path between the port of the storage controller and the computer. The computer uses the static MAC addresses and the corresponding ports to create a static map and uses the static map to determine which port of the computer to use to service a storage request.

20 Claims, 8 Drawing Sheets

(56) References Cited

U.S. PATENT DOCUMENTS

| | | | | |
|---|---|---|---|---|
| 2012/0033678 A1* | 2/2012 | Page | ..................... | H04L 49/552 |
| | | | | 370/401 |
| 2013/0148547 A1* | 6/2013 | Page | ....................... | H04L 41/12 |
| | | | | 370/255 |
| 2018/0287912 A1* | 10/2018 | Zabarsky | ............... | G06F 3/0635 |
| 2019/0102093 A1* | 4/2019 | Parnell | ................. | G06F 3/0617 |
| 2021/0297363 A1* | 9/2021 | Charles | ................. | H04L 47/726 |

* cited by examiner

SERVICING STORAGE REQUESTS USING AN OPTIMAL PATH IN A COMPOSITE CLOUD ENVIRONMENT

FIELD

The subject matter disclosed herein relates to servicing storage requests and more particularly relates to using an optimal data path for servicing storage requests.

BACKGROUND

Data centers are typically systems with multiple computers (compute nodes) with data storage available to the computers by way of a storage area network ("SAN") with data storage devices such as hard disk drives, solid-state storage, optical drives, etc. being physically separated from the computers. Often the computers access the data storage devices via an Internet protocol ("IP"). A data storage protocol like Internet Small Computer Systems Interface ("iSCSI") is used to facilitate storage requests such as read requests, write requests, etc. Some data storage protocols include a plug-in at the computer so the operating system of the computer issues storage request commands to a SAN in the same way as a locally installed data storage device.

Typically, a SAN or other data network connected to the computers includes redundancy to maintain operation in the event that a device fails in a data pathway between the computer and the data storage devices of the SAN or other computing device. For example, instead of having a single switch, the SAN and/or data network may include two or more switches where the computer and other devices include a connection to each switch. Likewise instead of a single storage controller, the SAN will include multiple storage controllers. To take advantage of the multiple parallel data pathways, connections are sometimes grouped into a link aggregation group ("LAG") or a multi-chassis LAG ("MLAG") and data traffic is distributed among the parallel pathways to increase throughput. However, not all parallel data paths are the same number of hops so that one data pathway between two devices may have a higher latency than another data pathway between the same two devices. When servicing storage requests, using data pathways that are not optimal affects latency.

BRIEF SUMMARY

A method for directing data traffic on an optimal path is disclosed. An apparatus also performs the functions of the method. The method includes identifying, for each port of a storage controller of a data system, an optimal path between a port of the storage controller to a computer and identifying a port of the computer connected to the optimal path. The data system includes the computer, the storage controller and two or more interconnected switches connecting the computer and the storage controller. The method includes assigning a static IP address to each port of the storage controller, and transmitting to the computer, for each port of the storage controller, a static media access control ("MAC") address of a port of the storage controller and the corresponding port of the computer that is part of the optimal path between the port of the storage controller and the computer. The computer uses the static MAC addresses of the ports of the storage controller and the corresponding ports of the computer to create a static map. The computer uses the static map to determine which port of the computer to use to service a storage request for a particular port of the storage controller.

An apparatus for directing data traffic on an optimal path includes an optimal path module configured to identify, for each port of a storage controller of a data system, an optimal path between a port of the storage controller to a computer and to identify a port of the computer connected to the optimal path. The data system includes the computer, the storage controller, and two or more switches connecting the computer and the storage controller. The apparatus includes a static address module configured to assign a static IP address to each port of the storage controller and an optimal path transmission module configured to transmit to the computer, for each port of the storage controller, a static MAC address of a port of the storage controller and the corresponding port of the computer that is part of the optimal path between the port of the storage controller and the computer. The computer uses the static MAC addresses of the ports of the storage controller and the corresponding ports of the computer to create a static map, and the computer uses the static map to determine which port of the computer to use to service a storage request for a particular port of the storage controller. The modules include hardware circuits, a programmable hardware device, and/or program code. The program code is stored on computer readable storage media.

A method for directing data traffic on an optimal path after receiving a static MAC address and computer port for the optimal path includes receiving at a computer, for each port of a storage controller, a static MAC address of a port of the storage controller and a corresponding port of the computer. The port of the computer is connected to an optimal path from the port of the computer to the port of the storage controller, and the computer and storage controller are connected through two or more switches. Each port of the storage controller is assigned a static IP address. The method includes creating a static map that includes, for each port of the storage controller, a mapping between the static MAC address of a port of the storage controller and the port of the computer that is part of the optimal path between the port of the storage controller and the computer. In response to a storage request involving data storage controlled by the storage controller where the storage request identifies an IP address of a port of the storage controller to service the storage request, the method includes identifying the static MAC address associated with the IP address of the port of the storage controller, reading the static map to identify the port of the computer connected to the optimal path for the port of the storage controller, and servicing the storage request using the port of the computer connected to the optimal path.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
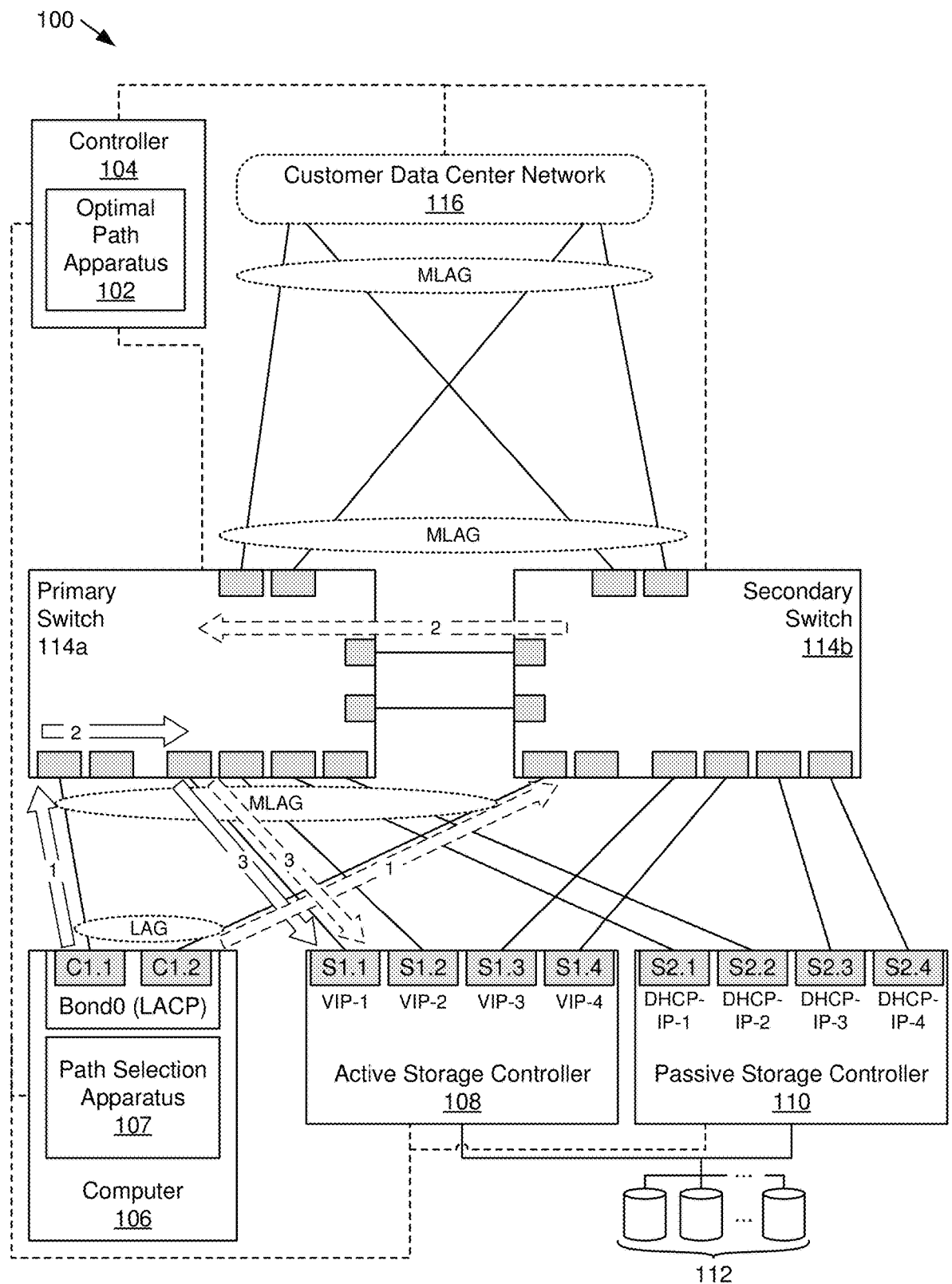
FIG. 1 is a schematic block diagram illustrating one embodiment of a system for directing data traffic on an optimal path.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include tangible devices like the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on a computer, partly on the computer, as a stand-alone software package, partly on the computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for directing data traffic on an optimal path is disclosed. An apparatus also performs the functions of the method. The method includes identifying, for each port of a storage controller of a data system, an optimal path between a port of the storage controller to a computer and identifying a port of the computer connected to the optimal path. The data system includes the computer, the storage controller and two or more interconnected switches connecting the computer and the storage controller. The method includes assigning a static IP address to each port of the storage controller, and transmitting to the computer, for each port of the storage controller, a static media access control ("MAC") address of a port of the storage controller and the corresponding port of the computer that is part of the optimal path between the port of the storage controller and the computer. The computer uses the static MAC addresses of the ports of the storage controller and the corresponding ports of the computer to create a static map. The computer uses the static map to determine which port of the computer to use to service a storage request for a particular port of the storage controller.

In some embodiments, the storage controller is an active storage controller and the data system includes a passive storage controller and the method includes identifying, for each port of the passive storage controller, an optimal path from a port of the passive storage controller to the computer and identifying a port of the computer connected to the optimal path. In response to determining that the active storage controller is unavailable, the method includes transferring, for each port of the active storage controller, the static IP address of a port of the active storage controller to a corresponding port of the passive storage controller, and transmitting to the computer, for each port of the passive storage controller, a static MAC address of the port of the passive storage controller and the port of the computer that is part of the optimal path between the port of the passive storage controller and the computer. The computer uses static MAC addresses of the ports of the passive storage controller and the corresponding ports of the computer to revise the static map and the computer uses the static map to determine which port of the computer to use to service a storage request for a particular port of the storage controller.

In further embodiments, the method includes assigning to each of the ports of the active storage controller a virtual IP address linked to the static IP address of the active storage controller and assigning to each of the ports of the passive storage controller a static IP address and, in response to determining that the active storage controller is unavailable, replacing, for each port of the passive storage controller, a static IP address of a port with the static IP address and corresponding virtual IP address of the corresponding port of the active storage controller. In other embodiments, the method includes selecting a storage controller of the data system to be the active storage controller and a different storage controller of the data system to be the passive storage controller.

In some embodiments, two or more ports of the computer are assigned to a LAG and each of the two or more switches includes a connection to a port of the computer. In further embodiments, ports of the LAG on the computer are controlled by a link aggregation control protocol ("LACP") and the LACP uses the static map to determine which port of the computer to use to communicate with the storage controller to service a storage request instead of the LACP determining of which port of the computer to communicate with the storage controller for servicing the storage request. In other embodiments, the method includes disabling dynamic determination of IP addresses of the ports of the storage controller in conjunction with assigning the static IP addresses. In other embodiments, assigning a static IP address includes converting an IP address of a port of the storage controller to the static IP address. In other embodiments, the two or more interconnected switches are interconnected with an inter-switch link.

An apparatus for directing data traffic on an optimal path includes an optimal path module configured to identify, for each port of a storage controller of a data system, an optimal path between a port of the storage controller to a computer and to identify a port of the computer connected to the optimal path. The data system includes the computer, the storage controller, and two or more switches connecting the computer and the storage controller. The apparatus includes a static address module configured to assign a static IP address to each port of the storage controller and an optimal path transmission module configured to transmit to the computer, for each port of the storage controller, a static MAC address of a port of the storage controller and the corresponding port of the computer that is part of the optimal path between the port of the storage controller and the computer. The computer uses the static MAC addresses of the ports of the storage controller and the corresponding ports of the computer to create a static map, and the computer uses the static map to determine which port of the computer to use to service a storage request for a particular port of the storage controller. The modules include hardware circuits, a programmable hardware device, and/or program code. The program code is stored on computer readable storage media.

In some embodiments, the storage controller is an active storage controller and the data system includes a passive storage controller and the optimal path module is further configured to identify, for each port of the passive storage controller, an optimal path from a port of the passive storage controller to the computer and to identify a port of the computer connected to the optimal path. In the embodiment, the apparatus includes a switch module configured to, in response to determining that the active storage controller is unavailable, transfer, for each port of the active storage controller, the static IP address of a port of the active storage controller to a corresponding port of the passive storage controller, wherein the passive storage controller becomes a new active storage controller. In the embodiment, the optimal path transmission module is further configured to, in response to determining that the active storage controller is unavailable, transmit to the computer, for each port of the new active storage controller, a static MAC address of the port of the new active storage controller and the port of the computer that is part of the optimal path between the port of the new active storage controller and the computer. The computer uses static MAC addresses of the ports of the new active storage controller and the corresponding ports of the computer to revise the static map, and the computer uses the static map to determine which port of the computer to use to service a storage request for a particular port of the storage controller.

In some embodiments, the switch module is further configured to assign to each of the ports of the active storage controller a virtual IP address linked to the static IP address of the active storage controller and the static address module is further configured to assign to each of the ports of the passive storage controller a static IP address and, in response to determining that the active storage controller is unavailable, the switch module replaces, for each port of the passive storage controller, a static IP address of a port with the static IP address and corresponding virtual IP address of the corresponding port of the active storage controller. In further embodiments, the apparatus includes an active selection module configured to select a storage controller of the data system to be the active storage controller and a different storage controller of the data system to be the passive storage controller.

In some embodiments, two or more ports of the computer are assigned to a LAG and each of the two or more switches includes a connection to a port of the computer. In other embodiments, ports of the LAG on the computer are controlled by a LACP and the LACP uses the static map to determine which port of the computer to use to communicate with the storage controller to service a storage request instead of LACP determining of which port of the computer to send data to the storage controller for servicing the storage request. In other embodiments, the apparatus includes a learning disable module configured to disable dynamic determination of IP addresses of the ports of the storage controller in conjunction with assigning the static IP addresses.

A method for directing data traffic on an optimal path after receiving a static MAC address and computer port for the optimal path includes receiving at a computer, for each port of a storage controller, a static MAC address of a port of the storage controller and a corresponding port of the computer. The port of the computer is connected to an optimal path from the port of the computer to the port of the storage controller, and the computer and storage controller are connected through two or more switches. Each port of the storage controller is assigned a static IP address. The method includes creating a static map that includes, for each port of the storage controller, a mapping between the static MAC address of a port of the storage controller and the port of the computer that is part of the optimal path between the port of the storage controller and the computer. In response to a storage request involving data storage controlled by the storage controller where the storage request identifies an IP address of a port of the storage controller to service the storage request, the method includes identifying the static MAC address associated with the IP address of the port of the storage controller, reading the static map to identify the port of the computer connected to the optimal path for the port of the storage controller, and servicing the storage request using the port of the computer connected to the optimal path.

In some embodiments, the storage controller is an active storage controller and the data system includes a passive storage controller and the method includes, in response to the passive storage controller becoming a new active storage controller, receiving at the computer, for each port of the new active storage controller, a static MAC address of a port of the new active storage controller and a corresponding port of the computer. The port of the computer is connected to an optimal path from the port of the computer to the port of the new active storage controller. The computer and the new active storage controller are connected through the two or more switches, where each port of the new active storage controller is assigned a static IP address transferred from the previous active storage controller.

In the embodiments, the method includes creating a revised static map for each port of the new active storage controller where the revised static map includes a mapping between the static MAC address of a port of the new active storage controller and the port of the computer that is part of the optimal path between the port of the new active storage controller and the computer. In the embodiments, in response to a storage request involving data storage controlled by the new active storage controller where the storage request identifies an IP address of a port of the new active storage controller to service the storage request, the method includes identifying the static MAC address associated with the IP address of the port of the new active storage controller, reading the static map to identify the port of the computer connected to the optimal path for the port of the new active storage controller, and servicing the storage request using the port of the computer connected to the optimal path.

In some embodiments, in response to determining that the active storage controller is unavailable, for each port of the passive storage controller, a static IP address of a port is replaced with the static IP address and corresponding virtual IP address of the corresponding port of the active storage controller and the method includes receiving for each static MAC address a corresponding static IP address newly assigned to the passive storage controller, which is the new active storage controller. In other embodiments, two or more ports of the computer are assigned to a LAG and each of the two or more switches includes a connection to a port of the computer. Ports of the LAG on the computer are controlled by a LACP and the method includes, in response to a storage request, directing the LACP to use the static map to determine which port of the computer to use to communicate with the storage controller while servicing the storage request.

FIG. 1 is a schematic block diagram illustrating one embodiment of a system 100 for directing data traffic on an optimal path. The system 100 includes an optimal path apparatus 102 in a controller 104, a computer 106, a path selection apparatus 107, an active storage controller 108, a passive storage controller 110, data storage devices 112, a primary switch 114a, a secondary switch 114b, and a customer data center network 116, which are described below.

The system 100 depicts a portion of a typical network communicating using an internet protocol ("IP") where data is transmitted between IP addresses. In the system 100 of FIG. 1, the primary and secondary switches 114a, 114b (or "switches 114") are connected to various computing devices that typically send workloads to the computer 106 for processing and the computer 106 and other devices send data to the data storage devices 112 for data storage. While a single computer 106 is depicted, typically a system such as the system 100 depicted in FIG. 1 will include multiple computers 106, also called compute nodes, each configured to process workloads as requested by customer computers, such as clients, hosts, etc. Typically, the system 100 is part of a data center, but the system 100 may include other implementations that include one or more computers 106 processing data and workloads for a customer where data is stored on data storage devices 112 through one or more storage controllers, such as the active storage controller 108 and passive storage controller 110 and data is transmitted from the computer 106 to the storage controller 108, 110 via two or more switches 114 using an IP protocol.

The data storage devices 112 typically provide a large data storage capacity. The active and passive storage controllers 108, 110 and associated data storage devices 112, in some embodiments, are part of a storage area network ("SAN"). The active and passive controllers 108, 110 provide redundancy and other embodiments may include more than two storage controllers. The primary switch 114a and secondary switch 114b also provide redundancy in addition to increased data transmission capacity. Other embodiments may include more switches.

The controller 104 identifies port information and data pathways of the system 100 and the optimal path apparatus 102 identifies, for each port of the storage controllers 108, 110, an optimal path from a port of a storage controller (e.g. 108) to a port of the computer 106. The optimal path apparatus 102 assigns a static IP address to each port of the storage controllers 108, 110 and transmits a media access control ("MAC") address of a port on the active storage controller 108 and corresponding port of the computer 106 on the optimal path to the computer 106. The path selection apparatus 107 creates a static map for each port of the storage controllers 108, 110 with a mapping between each static IP address of a port of the storage controllers 108, 110 and the port of the computer 106 that is part of the optimal data path. The computer 106 then uses the static map to route data from a port along the optimal data path to a storage controller (e.g. 108). Thus, the optimal path apparatus 102 overrides current link aggregation control protocol ("LACP") routing to send data from the computer 106 to the storage controller 108 along an optimal data path, which reduces latency. The optimal path apparatus 102 and the path selection apparatus 107 are described in more detail with regard to the apparatuses 200, 300, 400 of FIGS. 2, 3 and 4.

The controller 104, in some embodiments, is a cloud-based controller used to control IP addresses and other aspects of the network of the system 100 of FIG. 1. In some embodiments, the controller 104 is external to the customer data center and a portion of the capacity of the controller 104 is leased. In other embodiments, the controller 104 is owned by the owner of the data center. Typically, the controller 104 has access to all of the devices of the system 100 and information about the devices of the system 100, such as IP addresses for each port, a MAC address of each port, a topology of data connections between the devices of the system 100, and the like. In some embodiments, the controller 104 has a part in managing IP addresses of the system 100.

In some embodiments, the system 100 includes an address resolution protocol ("ARP") table that includes IP addresses and corresponding MAC addresses of the ports of the devices of the system 100. In some embodiments, the ARP table is located in the primary switch 114*a*. In other embodiments, the ARP table is listed elsewhere. ARP is a communication protocol used for discovering the link layer (layer 2) address, such as a MAC address, associated with a given internet layer (layer 3) address, which is typically an IPv4 address. In other embodiments, the system 100 uses a protocol different than ARP for discovery of IP addresses and associated MAC addresses, such as the Neighbor Discovery Protocol ("NDP"). One of skill in the art will recognize other appropriate discovery protocols.

Applications on the computer 106 and customer computing devices, in some embodiments, access data storage devices 112 using industry standard protocols. For example, the industry standard protocols may include Internet Small Computer Systems Interface ("iSCSI"), Non-Volatile Memory Express ("NVMe") over Transmission Control Protocol/Internet Protocol ("TCP/IP"), RDMA over Converged Ethernet ("RoCE") version 2 (RDMA is remote direct memory access), and the like. The listed protocols are typically used for a SAN and are all run on IP. The optimal path apparatus 102 is applicable to IP networks.

The computer 106 is computing device that includes one or more processors. The computer 106 includes a network interface card or similar device that includes two ports C1.1 and C1.2 for network connection to other devices. Other embodiments of the computer 106 include more than two ports. The computer 106 includes memory and may include other typical computing components, such as a north bridge, a south bridge, an input/output device connection, non-volatile data storage, a graphics interface card for connection to an electronic display, and/or other typical devices of a computer. In some embodiments, the computer 106 is a rack-mounted computer and may be a blade server or similar device. In some embodiments where the computer 106 is rack mounted, some devices typically found in a computer may also be rack mounted, such as a power supply, data storage, etc. In some embodiments, the computer 106 includes a baseboard management controller ("BMC") or similar device for out-of-band control, updates, etc. In other embodiments, the computer 106 is a stand-alone computer. The computer 106, in other embodiments, is a workstation. The computer 106 communicates with the storage controllers 108, 110 over a computer network using IP. One of skill in the art will recognize other configurations of the computer 106.

The active storage controller 108 and passive storage controller 110 are computing devices capable of receiving and servicing storage commands to write data, read data, etc. to the data storage devices 112. In some embodiments, the storage controllers 108 manage logical-to-physical mapping where data storage space of the devices of the data storage devices 112 have physical addresses that are mapped to logical entities, such as logical volumes. In some embodiments, the data storage devices 112 are configured in a Redundant Array of Independent Disks ("RAID") array or other redundant data storage configuration and the RAID controller or other redundant data storage controller is located in the storage controllers 108, 110 and/or data storage devices 112. The storage controllers 108, 110 include one or more processors, memory, busing, and other computing components for controlling data storage. The storage controllers 108, 110 are each depicted with four ports for connection to the switches 114, but may include additional ports. The storage controllers 108, 110 also include ports for connection to data storage devices 112, and may include redundant ports. Detail of the connections to the data storage devices 112 are not shown.

The active storage controller 108, as depicted, includes four ports S1.1, S1.2, S1.3 and S1.4. Each port of the active storage controller 108 is assigned a virtual IP ("VIP") address. Virtual IP address VIP-1 is assigned to port S1.1, VIP-2 is assigned to port S1.2, etc. The passive storage controller 110 also includes ports S2.1, S2.2, S2.3 and S2.4. The ports of the passive storage controller 110 are configured using Dynamic Host Configuration Protocol ("DHCP") and each port is assigned a DHCP IP address. DHCP is a network management protocol used on IP networks for automatically assigning IP addresses and other communication parameters to devices connected to an IP network using a client-server architecture. The first port S2.1 of the passive storage controller 110 is assigned DHCP-IP-1, S2.2 is assigned DHCP-IP-2, etc. In the system 100, having virtual IP addresses assigned to the ports and using the DHCP protocol allows the virtual IP addresses of the active storage controller 108 to be reassigned to the passive storage controller 110 if the active storage controller 108 is not available, which allows for a seamless transfer of assignment of active status from one of the storage controllers (e.g. 108) to the other storage controller (e.g. 110).

The switches 114 are data switches capable of routing data from an incoming port to an outgoing port. While a particular number of ports are depicted, it is understood that the switches 114 may include additional ports. The switches 114 are each configured with ports for inter-link connections to transmit data between switches 114. For example, data from port C1.2 of the computer 106 to port VIP-1 of the active storage controller 108 is routed from port C1.2 to a port on the secondary switch 114*b*, across the inter-link connection between the switches 114 to the primary switch 114*a*, and then to port VIP-1 of the active storage controller 108. The switches 114 include hardware typical of a switch, which may include one or more processors, queues, ports, a routing table, and the like. One of skill in the art will recognize other features of the switches 114.

The computer 106 includes two ports C1.1 and C1.2. The two ports C1.1 and C1.2 are grouped virtually into a single trunk line. In some embodiments, ports C1.1 and C1.2 are grouped in a Link Aggregation Group ("LAG") according to Institute of Electrical and Electronics Engineers ("IEEE") standard 8802.3AG or similar standard. A LAG or other virtual grouping of ports is treated as a single link and traffic is split between the ports. Other ports of the switches 114, customer devices of the customer data center network 116, etc. may also be grouped virtually and may use a LAG or a multi-chassis link aggregation group ("MLAG").

Port C1.1 is connected to a port (grey box) of the primary switch 114a and port C1.2 is connected to a port of the secondary switch 114b. The ports of the switches 114a, 114b that are connected to the computer 106 are included in a MLAG as shown in FIG. 1, which works similar to a LAG but is spread over multiple devices that communicate with each other. In the system 100, the switches 114 are connected with an inter-switch link combined in a LAG so that data can be transmitted between the switches 114 using either connection. For the customer data center network 116, which may include two or more routers connected to the switches 114, the connections are also grouped in MLAGs. One of skill in the art will recognize other configurations of network connections between the devices of the system 100 or other similar system.

As an example, if the computer 106 issues a command to store data and directs data to VIP-1 on the active storage controller 108, there are two possible pathways. The first pathway, depicted in FIG. 1 as solid wide arrows, has a first portion (arrow marked "1") of the pathway from port C1.1 of the computer 106 to a port on the primary switch 114a, a second portion (arrow marked "2") through the primary switch 114a, and then a third portion (arrow marked "3") from another port on the primary switch 114a to VIP-1 (port S1.1).

An alternate pathway, depicted in FIG. 1 as dashed wide arrows, includes a first portion (dashed arrow marked "1") from port C1.2 of the computer 106 to a port on the secondary switch 114b, a second portion (dashed arrow marked "2") across the inter-switch link to the primary switch 114a, then a third portion (dashed arrow marked "3") to VIP-1 of the active storage controller 108. Clearly the first path is the optimal data path for data traffic from the computer 106 to VIP-1. Each virtual port VIP-1 to VIP-4 has two pathways from the computer 106 where one of the two pathways of a virtual port (e.g. VIP-2) is an optimal data path. The same is true for the DHCP ports of the passive storage controller 110. While the example is for data transfers from the computer 106 to VIP-1, the example is also applicable to other computing devices of the system 100 that have redundant pathways to the storage controllers 108.

A storage protocol, such as iSCSI, takes care of the complexity of data transfers from the computer 106 to a storage controller 108, 110. In some embodiments, when the computer 106 transfers data to the active storage controller 108, the computer 106 also transfers a copy of the same data to the passive storage controller 110 so that the passive storage controller 110 maintains a shadow copy of data on the active storage controller 108. Typically, the computer 106 just sees a hard disk drive ("HDD") or other storage device as if the storage device is mounted on the computer 106 even though the actual data storage is remote from the computer 106 in a SAN or similar storage structure.

Typically, iSCSI or other storage protocol sends "hello" messages to the switches 114, storage controllers 108, 110, and other devices of the system 100 to ensure that the devices are active and functional. If the active storage controller 108 becomes unavailable, the passive storage controller 110 becomes a new active storage controller. In some embodiments, the primary switch 114a determines which storage controller 108, 110 is the active storage controller. In other embodiments, the controller 104 or another device determines which storage controller 108, 110 is the active storage controller. The controller 104 reassigns the virtual port IDs VIP-1 to VIP-4 to the ports S2.1-S2.4 of the passive storage controller 110 so that the computer 106 and other devices of the system 100 do not need to change which virtual port to which the computer 106 and other devices send data.

The LAG of the ports C1.1 and C1.2 of the computer 106 are under a logical entity "Bond0." In some embodiments, the computer 106 uses the Linux operating system, which creates "bonds" as logical entities. However, the logical entity for the ports may have a different name. In other embodiments, the computer 106 uses another operating system and the logical entity for the ports may be named differently. Bond0 includes a LAG that includes C1.1 and C1.2 and the LAG is controlled using LACP. For a typical LAG, LACP seeks to evenly distribute data traffic over the two ports of the LAG.

In one embodiment, LACP uses a hash algorithm of the IP addresses of the source port and the destination port to determine which port to use for data transmission between the source and destination ports. In some embodiments, the hash algorithm uses an exclusive OR ("XOR") function to combine the source and destination IP addresses and then uses a modulo 2 function on the result, which will result in a "0" or a "1," to determine the port to use for data transmission. One port is assigned a "0" and the other a "1" so that if the hash algorithm results in a "0," then the LACP transmits data using the port assigned to "0," and if the hash algorithm results in a "1," then the LACP transmits data using the port assigned to "1." In other embodiments, the LACP uses a different algorithm to determine which port to use for data transmission. In other embodiments, the computer 106 uses a protocol different than LACP for managing data traffic between the ports in the LAG. The embodiments described herein beneficially modify LACP operation of Bond0 of the computer 106 based on commands and information from the optimal path apparatus 102 to cause data transmitted to ports of the active and passive storage controllers 108, 110 to follow an optimal data path to minimize latency, as will be described below.

As discussed above, there are two data pathways between the computer 106 (or other computing device of the system 100) to any port on the storage controllers 108, 110. In a typical system, when the computer 106 wants to store data on data storage device 112, initially the operating system of the computer 106, such as Linux, accesses the routing table and an ARP table and discovers that the pathway to the active storage controller 108 is through Bond0 and will store a data packet to be transmitted on a TCP/IP stack. Controls for the TCP/IP stack then determine that the data on the stack is to be sent to VIP-1 and the controls need to know the source and destination MAC addresses, which requires consulting MAC address table. The MAC address table then indicates that the data should be sent via Bond0.

The LACP then determines which physical ports are associated with Bond0 so C1.1 and C1.2 are returned. The LACP then uses a hash algorithm to determine which port to use, C1.1 or C1.2. The path from C1.1 to VIP-1 is the shortest, but the hash algorithm may choose the longer path from C1.2 to VIP-1. The ports of the switches 114 connected to Bond0 are connected via an MLAG so the switches 114 know to use the inter-link connection between the switches 114a, 114b to route data when necessary. Thus, current systems transmit data along data pathways that are not optimal. The optimal path apparatus 102 solves this problem by ensuring that the optimal path between a port on a storage controller and the computer 106 is used for data transmission, as described below.

The controller 104 communicates with the devices of the system 100 and identifies port information and data pathways of the system 100. Typically, the controller 104 is in communication with the devices 106, 108, 110, 114 of the system 100 on a frequent basis. The controller 104, in some embodiments, uses messaging to the devices 106, 108, 110, 114 of the system 100 to discover the topology of the system 100, including connections, ports, MAC addresses, IP addresses, etc. For example, when the system 100 is initialized, the storage controllers 108, computer 106 and switches 114 are assigned IP addresses by an infrastructure DHCP server or similar device and the IP address information may be stored in a routing table and/or ARP table. In some embodiments, the controller 104 accesses a routing table and/or an ARP table to determine the topology of the system 100. For example, the primary switch 114a may include a DHCP server that maintains a routing table for the system 100. The primary switch 114a may also maintain the ARP table. In other embodiments, the controller 104 or other device in the system 100 creates and maintains the routing table and ARP table.

During system initialization, a storage controller 108, 110 is elected as the active storage controller 108. For example, the controller 104 may designate one storage controller as the active storage controller 108. In some embodiments, the controller 104 identifies MAC addresses of the ports of the devices 106, 108, 110, 114. In other embodiments, the controller 104 identifies the associated IP addresses, virtual IP addresses (e.g. VIP-1 to VIP-4, DCHP-IP-1 to DHCP-IP-4, Bond0, etc.), LAGs, MLAGs, etc. of the devices 106, 108, 110, 114, and the like. In some embodiments, the controller 104 identifies which devices 106, 108, 110, 114 are active or inactive.

Figure 2:
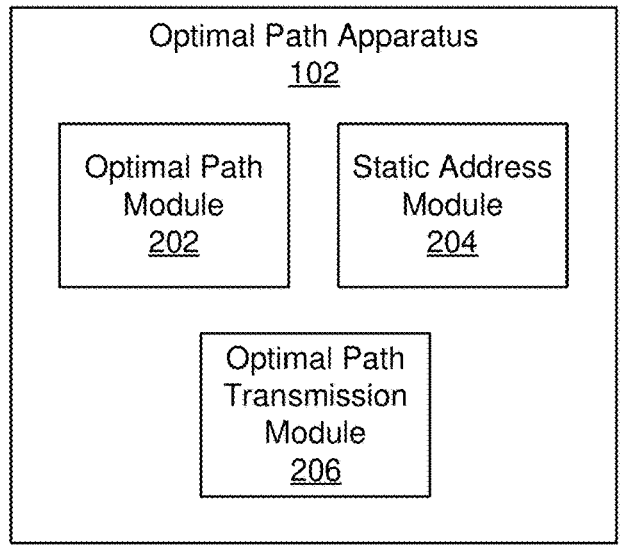
FIG. 2 is a schematic block diagram illustrating one embodiment of an apparatus for directing data traffic on an optimal path.

FIG. 2 is a schematic block diagram illustrating one embodiment of an apparatus 200 for directing data traffic on an optimal path. The apparatus 200 includes an embodiment of the optimal path apparatus 102 with an optimal path module 202, a static address module 204 and an optimal path transmission module 206, which are described below. In some embodiments, the optimal path apparatus 102 is implemented using program code stored on computer readable storage media, such as a solid-state drive ("SSD"), a HDD, or the like. The program code is executable on a processor. In other embodiments, the optimal path apparatus 102 is implemented using a programmable hardware device, such as a FPGA, programmable array logic, etc. In other embodiments, a portion or all of the optimal path apparatus 102 is implemented using hardware circuits. For example, the optimal path apparatus 102 may be implemented with a VLSI device. In other examples, the optimal path apparatus 102 is implemented using a combination of program code, hardware circuits, and/or a programmable hardware device. One of skill in the art will recognize other ways to implement the optimal path apparatus 102.

In some embodiments, the apparatus 200 includes an optimal path module 202 configured to identify, for each port of the storage controllers 108, 110, an optimal path from a port of the storage controllers 108, 110 to the computer 106 or other computing device of the system 100 and to identify a port of the computer 106 connected to the optimal path. For example, for VIP-1 of the active storage controller 108, the optimal path module 202 identifies a data path to port C1.1 of the computer 106. The optimal path is from VIP-1 to a port on the primary switch 114a and then from another port on the primary switch 114a to port C1.1 of the computer 106. For example, for VIP-3 of the active storage controller 108, the optimal path module 202 identifies a data path to port C1.2 of the computer 106. The data path is from VIP-3 to a port on the secondary switch 114b and from another port on the secondary switch 114b to C1.2 of the computer 106.

The optimal path module 202 uses information from the controller 104 to determine optimal paths. In some embodiments, the optimal path module 202 determines an optimal path by counting the number of connections along the data path. For example, from VIP-1 to C1.1 there are two connections while there are three connections between VIP-1 and C1.2 so the optimal path module 202 chooses VIP-1 to C1.1 as the optimal path from VIP-1 to Bond0. In other embodiments, the optimal path module 202 uses current information about which switches 114 or other devices in the system 100 are active. For example, the optimal path module 202 may choose a different data path as an optimal path where a device, such as the primary switch 114a is not active. In other embodiments, the optimal path module 202 uses latency information to choose an optimal path. One of skill in the art will recognize other ways for the optimal path module 202 to determine an optimal path from a storage controller 108, 110 to a computer 106.

The apparatus 200 includes a static address module 204 configured to assign a static IP address to each port of the storage controllers 108, 110. Typically, ports are assigned a dynamic IP address that changes periodically for various reasons. The static address module 204 forces a static IP address to be assigned to each port of the storage controllers 108, 110. The static address module 204, in some embodiments, assigns a virtual IP address to each port of the elected active storage controller 108. For example, the IP address might be 192.186.0.11 for S1.1, which is assigned a logical ID of VIP-1, the IP address might be 192.186.0.12 for S1.2, which is assigned a logical ID of VIP-2, etc. In other embodiments, the static address module 204 merely discovers the virtual IP addresses assigned to the ports of the storage controllers 108, 110. In the system 100, the data network is a private network so the IP addresses are assignable locally and are not available externally on the Internet.

In some embodiments, the static address module 204 converts the assigned dynamic IP addresses of the ports of the storage controllers 108, 110 to static IP addresses. In other embodiments, the static address module 204 assigns a specific IP address to each port of the storage controllers 108, 110. In other embodiments, the static address module 204 also assigns static IP addresses to the ports of the passive storage controller 110. In the event that the active storage controller 108 is unavailable, the virtual IP addresses of the active storage controller 108 may be moved to the ports of the passive storage controller 110. In some embodiments, the primary switch 114a forwards VIP and MAC address information to the controller 104 once the active storage controller 108 is assigned as being active.

The apparatus 200 includes an optimal path transmission module 206 configured to transmit to the computer 106, for each port of the active storage controller 108, a static media access control ("MAC") address of a port (e.g. S1.1) of the active storage controller 108 and the corresponding port (e.g. C1.1) of the computer 106 that is part of the optimal path between the port of the active storage controller 108 and the computer 106. The controller of typical systems make IP addresses of various devices available to other devices within the system. Typically, controllers to not transmit MAC addresses, which are layer 3 information. The optimal path transmission module 206, in the embodiments described herein, transmits MAC addresses of the ports of the storage controllers 108, 110 to the computer 106, which differs from other systems and provides a mechanism for the computer 106 to transmit and receive data from the storage controllers 108, 110 along optimal paths.

For each static MAC address of the active storage controller 108 that the optimal path transmission module 206 transmits to the computer 106, the optimal path transmission module 206 also transmits a corresponding port of the computer 106 that is part of the optimal path to the port of the active storage controller 108. For example, for port S1.1 (VIP-1) of the active storage controller 108, port C1.1 of the computer 106 corresponds to the optimal path from C1.1 to the primary switch 114a and then to S1.1 of the active storage controller 108. The computer 106 then uses the static MAC addresses of the active storage controller 108 and corresponding ports of the computer 106 to create a static map and the LACP suspends using a hash algorithm to determine the port of the computer 106 to service storage requests and instead uses the static map to determine the port (e.g. C1.1) of the computer 106 to communicate with a particular port (e.g. VIP-1) of the active storage controller 108.

In some embodiments, the optimal path transmission module 206 also transmits the IP address and/or virtual IP address associated with each static MAC address transmitted to the computer 106. For example, where the optimal path transmission module 206 transmits the static MAC address of port S1.1 of the active storage controller 108, the optimal path transmission module 206 also transmits VIP-1 and/or the actual static IP address of S1.1. Where the virtual IP address VIP-1 is transmitted, the computer 106 typically has access to the ARP table and identifies the IP address of VIP-1. In addition, the computer 106 may access the ARP table to find the IP address and/or virtual IP address associated with a received static MAC address.

Some systems assign dynamic MAC addresses to ports of devices and the dynamic MAC addresses of the ports may change over time. Where the system 100 uses dynamic MAC addresses, in some embodiments, for each port of the storage controllers 108, 110 the optimal path apparatus 102 makes the MAC address assigned to a particular port static. For example, the static address module 204 may make static the MAC address assigned to a port of the storage controllers 108, 110. Having static MAC addresses simplifies maintenance of the static map of the computer 106.

Figure 3:
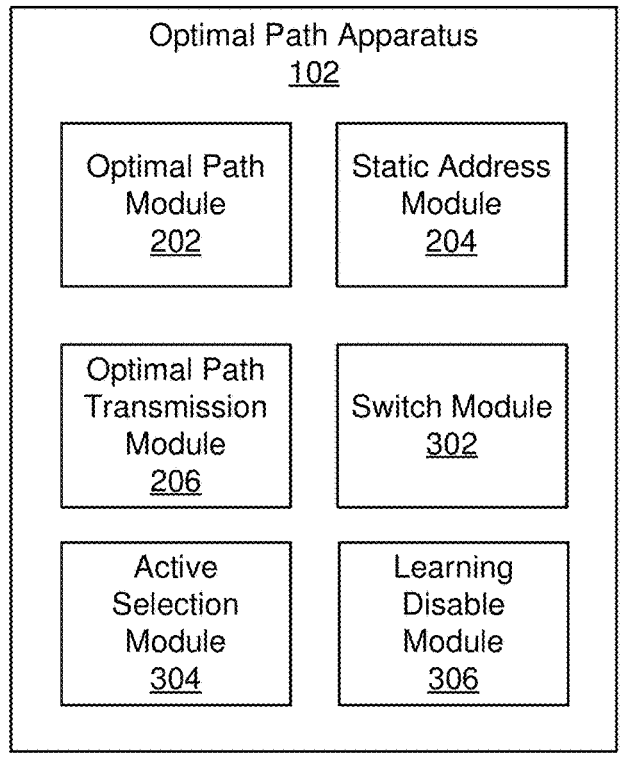
FIG. 3 is a schematic block diagram illustrating another embodiment of an apparatus for directing data traffic on an optimal path.

FIG. 3 is a schematic block diagram illustrating another embodiment of an apparatus 300 for directing data traffic on an optimal path. The apparatus 300 includes another embodiment of the optimal path apparatus 102 that includes an optimal path module 202, a static address module 204, and an optimal path transmission module 206, which are substantially similar to those described above in relation to the apparatus 200 of FIG. 2. The embodiment of the optimal path apparatus 102 also includes a switch module 302, an active selection module 304, and/or a learning disable module 306, which are described below. The embodiment of the optimal path apparatus 102 depicted in FIG. 3 may be implemented in similar ways as descried above in relation to the apparatus 200 of FIG. 2.

The apparatus 300, in some embodiments, includes a switch module 302 configured to, in response to determining that the active storage controller 108 is unavailable, transfer, for each port of the active storage controller 108, the static IP address of a port of the active storage controller 108 to a corresponding port of the passive storage controller 110. The passive storage controller 110 becomes a new active storage controller. For example, where a static IP address is 192.186.0.11 for S1.1 on the failed active storage controller 108, the switch module 302 moves 192.186.0.11 to S2.1 of the new active storage controller 110.

The optimal path transmission module 206 is further configured to, in response to determining that the active storage controller 108 is unavailable, transmit to the computer 106, for each port of the new active storage controller 110, a static MAC address of the port of the new active storage controller 110 and the port of the computer 106 that is part of the optimal path between the port of the new active storage controller 110 and the computer 106. The optimal path module 202 identifies at that time of a failure of the active storage controller 108 or previously identifies, for each port of the passive storage controller 110, an optimal path from a port of the passive storage controller 110 to the computer 106 and identifies a port of the computer 106 connected to the optimal path.

In some embodiments, the switch module 302 transfers virtual IP addresses of the ports of the failed active storage controller 108 to the passive storage controller 110. For example, when the virtual IP addresses of the active storage controller 108 are VIP-1, VIP-2, VIP-3 and VIP-4 and the active storage controller 108 is unavailable, the switch module 302 transfers VIP-1, VIP-2, VIP-3 and VIP-4 to the ports of the passive storage controller 110, which becomes the new active storage controller 110. The optimal path transmission module 206, when the active storage controller 108 goes down, transmits to the computer 106, for each port of the new active storage controller 110, a static MAC address of the port of the new active storage controller 110 and the port of the computer 106 that is part of the optimal path between the port of the new active storage controller 110 and the computer 106.

For example, where VIP-1 is moved to S2.1 of the new active storage controller 110, the optimal path from S2.1 to the computer 106 is through port C1.1 of the computer 106. The optimal path transmission module 206 transmits to the computer 106 the static MAC address of S2.1 along with corresponding port C1.1 of the computer 106. In some embodiments, the optimal path transmission module 206 also transmits the IP address and/or virtual IP address (e.g. VIP-1) newly assigned to port S2.1 of the passive storage controller 110 along with the static MAC address of port S2.1 and corresponding port C1.1. For S2.2, the optimal path is to C1.1, for S2.3, the optimal path is to C1.2, and for S2.4, the optimal path is to C1.2 of the computer 106. The optimal path transmission module 206 transmits the IP addresses and/or virtual IP addresses, the corresponding static MAC addresses and the corresponding ports of the computer 106 to the computer 106. The computer 106 uses static MAC addresses of the ports of the new active storage controller 110 and the corresponding ports of the computer 106 to revise a static map at the computer 106 and the computer 106 then uses the revised static map to determine which port of the computer 106 to service storage requests for a particular port of the new active storage controller 110.

The apparatus 300 includes, in some embodiments, an active selection module 304 configured to select a storage controller 108, 110 of the data system 100 to be the active storage controller 108 and a different storage controller 110 of the data system 100 to be the passive storage controller 110. Where the active storage controller 108 fails, the active selection module 304 chooses another storage controller (e.g. 110) to be a new active storage controller 110. In other embodiments, the active selection module 304 merely discovers which storage controller is the active storage controller 108 and which is the passive storage controller 110 while another device, such as the primary switch 114*a* selects which storage controller is the active storage controller 108.

In some embodiments, the apparatus 300 includes a learning disable module 306 configured to disable dynamic determination of IP addresses of the ports of the storage controllers 108, 110 in conjunction with the static address module 204 assigning the static IP addresses to the ports of the storage controllers 108, 110. In some examples, the learning disable module 306 sends a message to the DHCP server to disable dynamic determination of the IP addresses of the ports of the storage controllers 108, 110 so that the DHCP server will not change the static IP addresses of the ports of the storage controllers 108, 110. Maintaining the static IP addresses of the storage controllers 108, 110 as static IP addresses facilitates easier management of switching which storage controller 108, 110 is active while maintaining virtual IP addresses or other IP addresses of the ports of the storage controllers 108, 110 without requiring iSCSI or other storage protocol to switch to a new virtual IP address for servicing a storage request.

Figure 4:
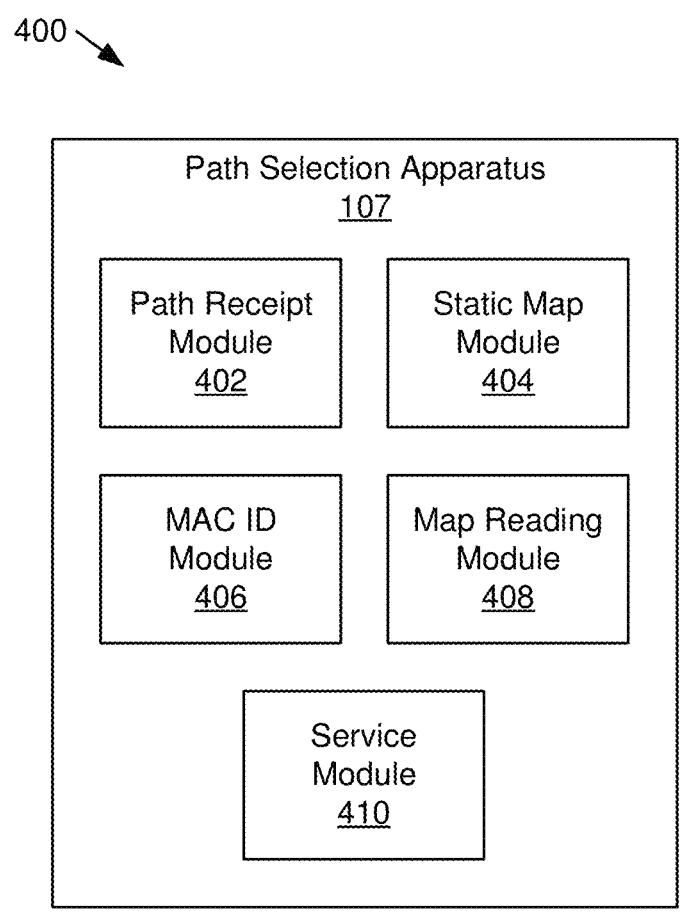
FIG. 4 is a schematic block diagram illustrating another embodiment of an apparatus in a computer for directing data traffic on an optimal path.

FIG. 4 is a schematic block diagram illustrating another embodiment of an apparatus 400 in a computer for directing data traffic on an optimal path. The apparatus 400 includes an embodiment of the path selection apparatus 107 that includes a path receipt module 402, a static map module 404, a MAC ID module 406, map reading module 408, and a service module 410, which are described below. The path selection apparatus 107 is located in a computer 106 that services storage requests for data storage devices 112 controlled by the active storage controller 108 and/or the passive storage controller 110. The path selection apparatus 107, in some embodiments, is implemented with program code executable by a processor of the computer 106. In other embodiments, all or a portion of the path selection apparatus 107 is implemented with a programmable hardware device and/or hardware circuits.

The apparatus 400 includes a path receipt module 402 configured to receive at the computer 106, for each port of a storage controller (e.g. 108), a static MAC address of a port of the storage controller 108 and a corresponding port of the computer (e.g. C1.1 or C1.2). The identified port (e.g. C1.1) of the computer 106 is connected to an optimal path from the port C1.1 of the computer 106 to the port (e.g. VIP-1) of the storage controller 108. The computer 106 and storage controller 108 are connected through two or more switches 114 and each port of the storage controller 108 is assigned a static IP address.

For example, the path receipt module 402 may receive, from the optimal path transmission module 206, static MAC addresses of ports of the active storage controller 108 and associated ports of the computer 106 that are part of an optimal path between a port (e.g. S1.1) of the active storage controller 108 and the port (e.g. C1.1) of the computer 106. The path receipt module 402 may also receive, from the optimal path transmission module 206, static MAC addresses of ports of the passive storage controller 110 and associated ports of the computer 106 that are part of an optimal path between a port (e.g. S2.1) of the passive storage controller 110 and the port (e.g. C1.1) of the computer 106. The path receipt module 402 may receive MAC addresses and corresponding ports of the computer 106 at the time the active storage controller 108 fails or at an earlier time.

The apparatus 400 includes a static map module 404 configured to create a static map that includes, for each port of the storage controller (e.g. 108), a mapping between the static MAC address of a port of the storage controller 108 and the port of the computer 106 that is part of the optimal path between the port of the storage controller 108 and the computer 106. The static map includes a mapping between the static MAC address of a port (e.g. S1.1) of a storage controller (e.g. 108) and the port (e.g. C1.1) of the computer 106 that is part of the optimal path between the port S1.1 of the storage controller 108 and the computer 106. For example, the static map for the active storage controller 108 may be as depicted in Table 1. Other versions of the static map may include a column for the virtual IP addresses or IP addresses currently corresponding to the MAC addresses.

TABLE 1

| Static Map | |
| --- | --- |
| Destination MAC Address | Outgoing Port |
| VIP-1 MAC Address | C1.1 |
| VIP-2 MAC Address | C1.1 |
| VIP-3 MAC Address | C1.2 |
| VIP-4 MAC Address | C1.2 |

The apparatus 400 includes a MAC ID module 406 configured to, in response to a storage request involving the data storage devices 112 controlled by the storage controller (e.g. 108) where the storage request identifies an IP address of a port of the storage controller 108 to service the storage request, identify the static MAC address associated with the IP address of the port of the storage controller 108. For example, the storage request may identify an IP address by way of an assigned virtual IP address, such as VIP-1 and the MAC ID module 406 returns the static MAC address of S1.1 of the storage controller 108.

The apparatus 400 includes a map reading module 408 configured to read the static map to identify the port (e.g. C1.1) of the computer 106 connected to the optimal path for the port VIP-1 of the storage controller 108 and a service module 410 configured to service the storage request using the port C1.1 of the computer 106 connected to the optimal path.

Thus, the MAC ID module 406, map reading module 408 and service module 410 of the path selection apparatus 107 of the computer 106 use the static map to determine which port of the computer 106 to use for servicing a storage request for a particular port of the storage controller 108. Having a static MAC address for each port of the storage controller 108 and having the static map causes the computer 106 to use routing of the static map. In some embodiments, the LACP controlling Bond0 recognizes that the destination port on the storage controller 108 includes a static MAC address and then uses the static map to route data from the computer 106 to a particular port (e.g. S1.1) on the active storage controller 108.

Where the active storage controller 108 fails and the passive storage controller 110 becomes a new active storage controller 110, the path receipt module 402 receives at the computer 106, for each port of the new active storage controller 110, a static MAC address of a port of the new active storage controller 110 and a corresponding port of the computer 106. The port of the computer 106 is connected to an optimal path from the port of the computer 106 to the port of the new active storage controller 110. The computer 106 and the new active storage controller 110 are connected through the switches 114 and each port of the new active storage controller 110 is assigned a static IP address transferred from the previous active storage controller 108.

Where the path receipt module 402 receives new MAC address/computer port information, the static map module 404 creates a revised static map for each port of the new active storage controller 110. The revised static map includes a mapping between the static MAC addresses of the ports of the new active storage controller 110 and the corresponding ports of the computer 106 that are part of the optimal path between the ports of the new active storage controller 110 and the computer 106.

Where the active storage controller 108 fails and there is a new active storage controller 110, the switch module 302 reassigns the static IP addresses and/or virtual IP addresses of the active storage controller 108 to the passive/new active storage controller 110 and the optimal path transmission module 206, in some embodiments, transmits the newly assigned IP addresses along with MAC addresses of the new active storage controller 110 so the path receipt module 402 receives the MAC addresses of the new active storage controller 110 and the corresponding static IP addresses and/or the virtual IP addresses of the ports of the new active storage controller 110.

For servicing storage requests, the MAC ID module 406 identifies the static MAC address associated with the IP address of the port of the new active storage controller 110, the map reading module 408 reads the static map to identify the port of the computer 106 connected to the optimal path for the port of the new active storage controller 110, and the service module 410 services the storage request using the port of the computer 106 connected to the optimal path. Where there is a LAG for the ports of the computer 106, the path selection apparatus 107 modifies operation of the LACP servicing the LAG for storage requests so that the LACP uses the port of the computer 106 in static map to service storage requests to a particular port of the active storage controller 108 or new active storage controller 110.

Figure 5:
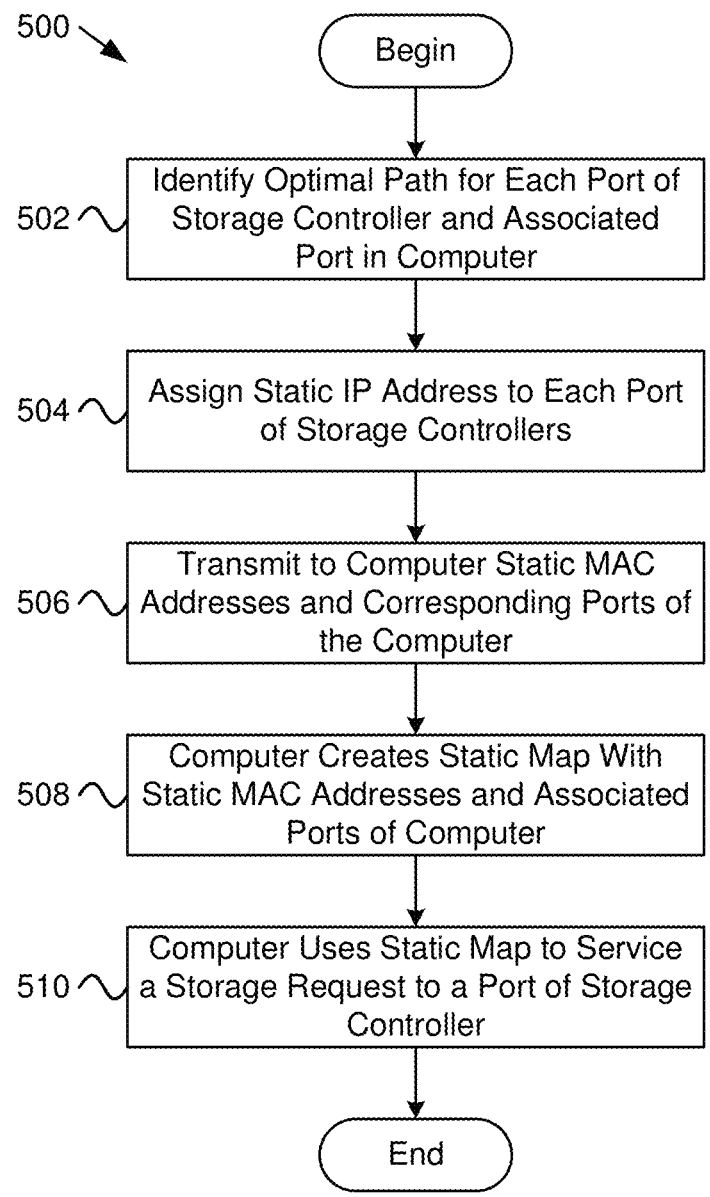
FIG. 5 is a schematic flow chart diagram illustrating one embodiment of a method for directing data traffic on an optimal path.

FIG. 5 is a schematic flow chart diagram illustrating one embodiment of a method 500 for directing data traffic on an optimal path. The method 600 begins and identifies 502, for each port of a storage controller 108 of a data system 100, an optimal path between a port (e.g. S1.3) of the storage controller 108 to a computer 106 and identifies 502 a port (e.g. C1.2) of the computer 106 connected to the optimal path. The data system 100 includes the computer 106, the storage controller 108 and two or more interconnected switches 114 connecting the computer 106 and the storage controller 108.

The method 600 assigns 504 a static IP address to each port of the storage controller 110 and transmits 506 to the computer 106, for each port of the storage controller 108, a static MAC address of a port of the storage controller 108 and the corresponding port of the computer 106 that is part of the optimal path between the port of the storage controller 108 and the computer 106. The method 500 transmits 506 to the computer 106, for each port of the storage controller 108, a static MAC address of a port of the storage controller 108 and the corresponding port of the computer 106 that is part of the optimal path between the port of the storage controller 108 and the computer 106.

The computer 106 creates 508 a static map using the static MAC addresses of the ports of the storage controller 108 and the corresponding ports of the computer 106 and the computer 106 uses 510 the static map to determine which port of the computer 106 to use to service a storage request for a particular port of the storage controller 108. For example, the static map may return port C1.1 for port VIP-1 of the storage controller 108. In various embodiments, the method 500 is implemented using all or a portion of the optimal path module 202, the static address module 204 and/or the optimal path transmission module 206.

Figure 6A:
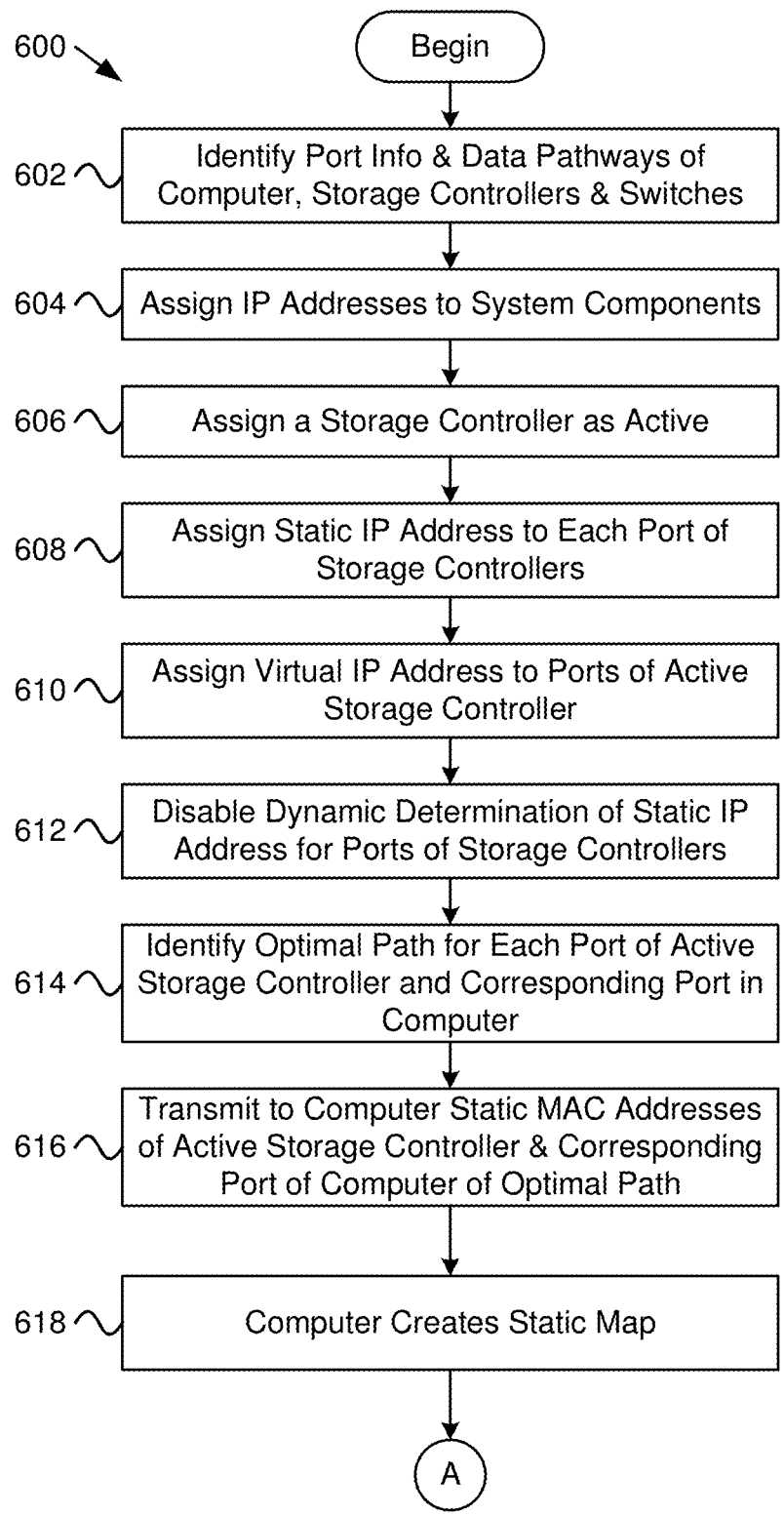
FIG. 6A is a first part of a schematic flow chart diagram illustrating another embodiment of a method for directing data traffic on an optimal path.
Figure 6B:
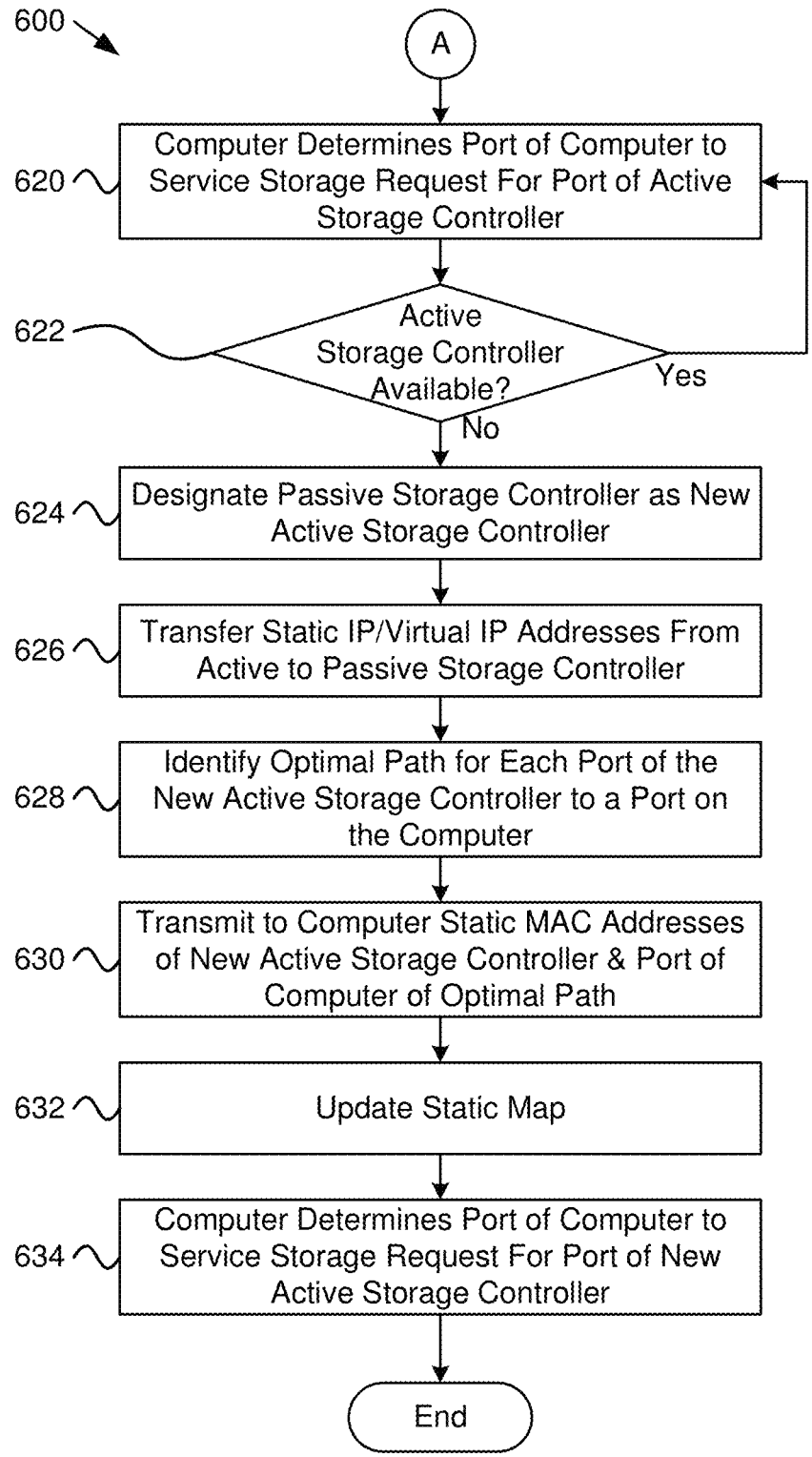
FIG. 6B is a second part of the schematic flow chart diagram of FIG. 6A.

FIG. 6A is a first part and FIG. 6B is a second part of a schematic flow chart diagram illustrating one embodiment of a method 600 for directing data traffic on an optimal path. The method 600 begins and identifies 602 port information and data pathways of the computer 106, the storage controllers 108, 110 and the switches 114a, 114b. For example, the controller 104 may discover the port information and data pathways. In another example, the optimal path apparatus 102 discovers the port information and data pathways.

The method 600 assigns 604 IP addresses to components (e.g. 106, 108, 110, 114) of the system 100. For example, a DHCP server may assign IP addresses to the components. The method 800 assigns a storage controller 108, 110 as the active storage controller 108. The method 600 assigns 608 a static IP address to each port of the storage controllers 108, 110 and assigns 610 a virtual IP address to each port of the active storage controller 108. The method 600 disables 612 dynamic determination of the static IP addresses of the storage controllers 108, 110 and identifies 614, for each port of the active storage controller 108, an optimal path between a port of the active storage controller 108 to a computer 106 and identifies a port of the computer 106 connected to the optimal path.

The method 600 transmits 616 to the computer 106, for each port of the active storage controller 108, a static MAC address of a port of the active storage controller 108 and the corresponding port of the computer 106 that is part of the optimal path between the port of the active storage controller 108 and the computer 106. The computer 106 then creates 618 a static map with the received static MAC addresses and corresponding ports of the computer 106 and the computer 106 determines 620 (follow "A" on FIG. 6A to "A" on FIG. 6B) which port of the computer 106 to use to service a storage request for a particular port of the active storage controller 108.

The method 600 determines 622 if the active storage controller 108 is still available. If the method 600 determines 622 that the active storage controller 108 is still available, the method 600 returns and the computer 106 continues to determine 620 which port of the computer 106 to use to service a storage request for a particular port of the active storage controller 108. If the method 600 determines 622 that the active storage controller 108 is not available, the method 600 designates 624 the passive storage controller 110 as a new active storage controller 110 and transfers 626 the static IP addresses and/or the virtual IP addresses of the ports of the active storage controller 108 to the new active storage controller 110.

The method 600 identifies 628 an optimal path for each port on the new active storage controller 110 to a port on the computer 106 and transmits 630 to the computer 106, for each port of the new active storage controller 110, a static MAC address of a port of the new active storage controller 110 and the corresponding port of the computer 106 that is part of the optimal path between the port of the new active storage controller 110 and the computer 106. The computer 106 updates 632 the static map with the new static MAC addresses from the new active storage controller 110 and the computer 106 determines 634 which port of the computer 106 to use to service each storage request for a port of the new active storage controller 110, and the method 600 ends. In various embodiments, the method 600 is implemented using all or a portion of the optimal path module 202, the static address module 204, the optimal path transmission module 206, the switch module 302, the active selection module 304, and/or the learning disable module 306.

Figure 7:
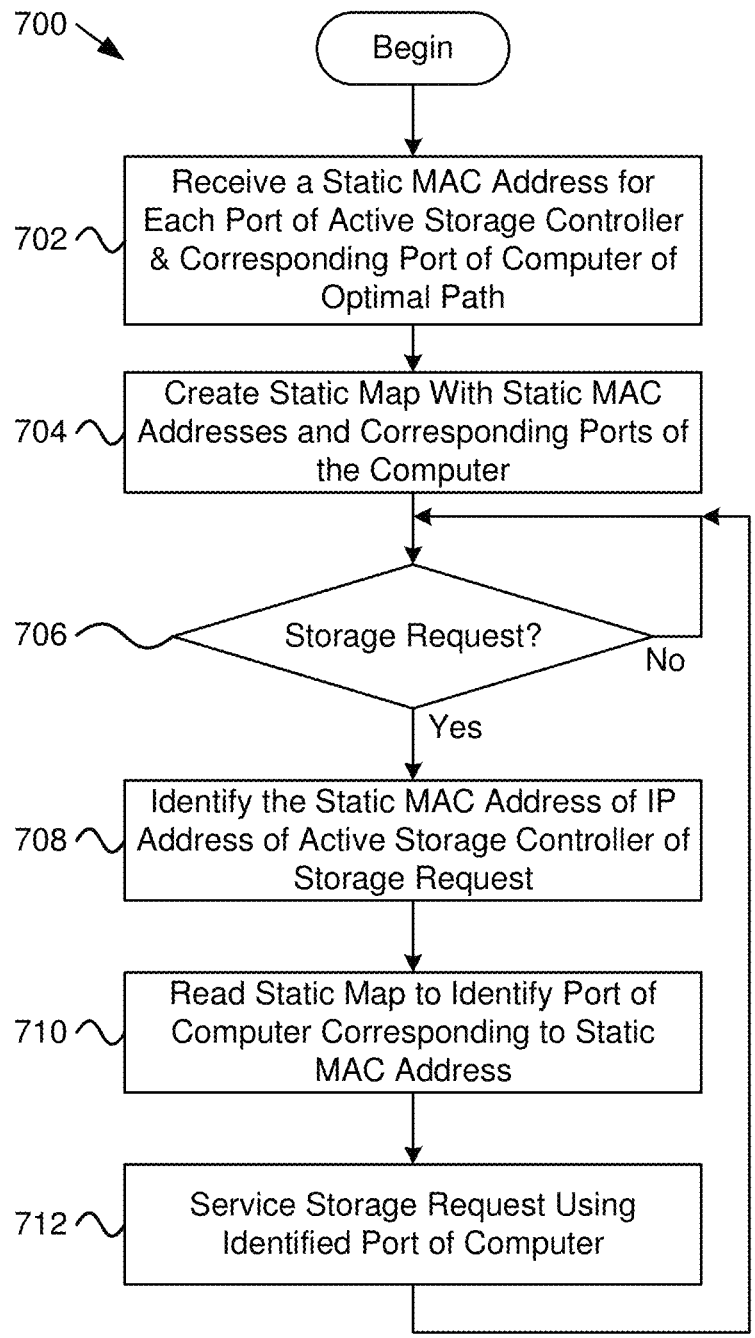
FIG. 7 is a schematic flow chart diagram illustrating one embodiment of a method for directing data traffic on an optimal path after receiving a static MAC address and computer port for the optimal path.

FIG. 7 is a schematic flow chart diagram illustrating one embodiment of a method 700 for a directing data traffic on an optimal path after receiving a static MAC address and computer port for the optimal path. The method 700 begins and receives 702 at a computer 106, for each port of an active storage controller 108, a static MAC address of a port of the active storage controller 108 and a corresponding port of the computer 106. The port of the computer 106 is connected to an optimal path from the port of the computer 106 to the port of the active storage controller 108. The computer 106 and active storage controller 108 are connected through two or more switches 114. Each port of the active storage controller 108 is assigned a static IP address.

The method 700 creates 704 a static map that includes, for each port of the active storage controller 108, a mapping between the static MAC address of a port of the active storage controller 108 and the port of the computer 106 that is part of the optimal path between the port of the active storage controller 108 and the computer 106. The method 700 determines 706 if there is a storage request involving the data storage devices 112 controlled by the storage controllers 108, 110. The storage request identifies an IP address of a port of the active storage controller 108 to service the storage request. In some embodiments, the storage request identifies a virtual IP address of a port of the active storage controller 108. If the method 700 determines 706 that there is not a storage request, the method 700 returns and continues to determine 706 if there is a storage request.

If the method 700 determines 706 that there is a storage request, the method 700 identifies 708 the static MAC address associated with the IP address of the port of the active storage controller 108, reads 710 the static map to identify the port of the computer 106 connected to the optimal path for the port of the active storage controller 108, and services 712 the storage request using the port of the computer 106 connected to the optimal path, and the method 700 returns and determines 706 if there is a storage request. In various embodiments, the method 700 is implemented using all or a portion of the path receipt module 402, the static map module 404, the MAC ID module 406, the map reading module 408 and/or the service module 410.

Figure 8:
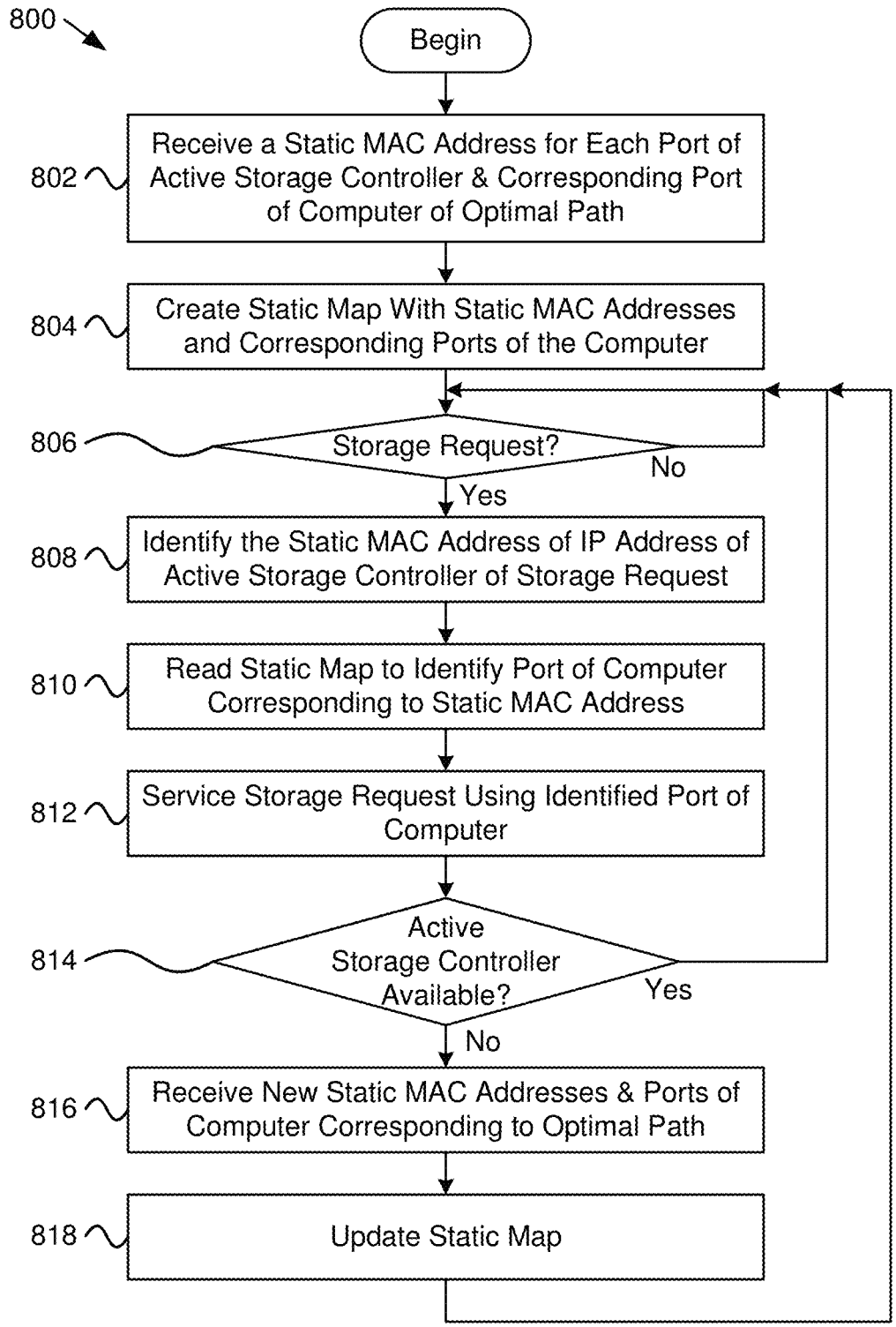
FIG. 8 is a schematic flow chart diagram illustrating another embodiment of a method for directing data traffic on an optimal path after receiving a static MAC address and computer port for the optimal path.

FIG. 8 is a schematic flow chart diagram illustrating another embodiment of a method 800 for a directing data traffic on an optimal path after receiving a static MAC address and computer port for the optimal path. The method 800 begins and receives 802 at a computer, for each port of an active storage controller 108, a static MAC address of a port of the active storage controller 108 and a corresponding port of the computer 106. The port of the computer 106 is connected to an optimal path from the port of the computer 106 to the port of the active storage controller 108. The computer 106 and active storage controller 108 are connected through two or more switches 114. Each port of the active storage controller 108 is assigned a static IP address.

The method 800 creates 804 a static map that includes, for each port of the active storage controller 108, a mapping between the static MAC address of a port of the active storage controller 108 and the port of the computer 106 that is part of the optimal path between the port of the active storage controller 108 and the computer 106. The method 800 determines 806 if there is a storage request involving the data storage devices 112 controlled by the storage controllers 108, 110. The storage request identifies an IP address of a port of the active storage controller 108 to service the storage request. In some embodiments, the storage request identifies a virtual IP address of a port of the active storage controller 108. If the method 800 determines 806 that there is not a storage request, the method 800 returns and continues to determine 806 if there is a storage request.

If the method 800 determines 806 that there is a storage request, the method 800 identifies 808 the static MAC address associated with the IP address of the port of the active storage controller 108, reads 810 the static map to identify the port of the computer 106 connected to the optimal path for the port of the active storage controller 108, and services 812 the storage request using the port of the computer 106 connected to the optimal path. The method 800 determines 814 if the active storage controller 108 is still available. If the method 800 determines 814 that the active storage controller 108 is still available, the method 800 returns and determines 806 if there is a storage request.

If the method 800 determines 814 that the active storage controller 108 is not available, the method 800 receives 816 new static MAC addresses of the new active storage controller 110 and corresponding ports of the computer 106 of the optimal paths between the new active storage controller 110 and the computer 106. The method 800 updates 818 the static map and returns and determines 806 if there is a storage request. In various embodiments, the method 800 is implemented using all or a portion of the path receipt module 402, the static map module 404, the MAC ID module 406, the map reading module 408 and/or the service module 410.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
identifying, for each port of a plurality of ports of a storage controller of a data system, an optimal path between a port of the storage controller to a computer and identifying a port of the computer connected to the optimal path, the data system comprising the computer, the storage controller and two or more interconnected switches connecting the computer and the storage controller;

assigning a static internet protocol ("IP") address to each port of the storage controller; and transmitting to the computer, for each port of the storage controller, a static media access control ("MAC") address of the identified port of the storage controller and the corresponding port of the computer that is part of the optimal path between the port of the storage controller and the computer, wherein each port of the storage controller comprises a static IP address and a corresponding static MAC address, wherein the computer uses the static MAC addresses of the identified ports of the storage controller and the corresponding ports of the computer to create a static map, the computer uses the static map to determine which port of the computer to use to service a storage request for a particular port of the storage controller, and wherein the static IP address of each port of the storage controller and the corresponding MAC address remain fixed to simplify maintenance of the static map.

2. The method of claim 1, wherein the storage controller is an active storage controller and the data system comprises a passive storage controller and further comprising:
  identifying, for each port of the passive storage controller, an optimal path from a port of the passive storage controller to the computer and identifying a port of the computer connected to the optimal path, and
  in response to determining that the active storage controller is unavailable:
    transferring, for each port of the active storage controller, the static IP address of a port of the active storage controller to a corresponding port of the passive storage controller; and
    transmitting to the computer, for each port of the passive storage controller, a static MAC address of the identified port of the passive storage controller and the corresponding port of the computer that is part of the optimal path between the port of the passive storage controller and the computer,
  wherein the computer uses static MAC addresses of the identified ports of the passive storage controller and the corresponding ports of the computer to revise the static map, the computer uses the static map to determine which port of the computer to use to service a storage request for a particular port of the passive storage controller.

3. The method of claim 2, further comprising assigning to each of the ports of the active storage controller a virtual IP address linked to the static IP address of the active storage controller and assigning to each of the ports of the passive storage controller a static IP address and, in response to determining that the active storage controller is unavailable, replacing, for each port of the passive storage controller, a static IP address of a port with the static IP address and corresponding virtual IP address of the corresponding port of the active storage controller.

4. The method of claim 2, further comprising selecting a storage controller of the data system to be the active storage controller and a different storage controller of the data system to be the passive storage controller.

5. The method of claim 1, wherein two or more ports of the computer are assigned to a link aggregation group ("LAG") and wherein each of the two or more switches comprises a connection to a port of the computer.

6. The method of claim 5, wherein ports of the LAG on the computer are controlled by a link aggregation control protocol ("LACP") and the LACP uses the static map to determine which port of the computer to use to communicate with the storage controller to service a storage request instead of the LACP determining of which port of the computer to communicate with the storage controller for servicing the storage request.

7. The method of claim 1, further comprising disabling dynamic determination of IP addresses of the ports of the storage controller in conjunction with assigning the static IP addresses.

8. The method of claim 1, wherein assigning a static IP address comprises converting an IP address of a port of the storage controller to the static IP address.

9. The method of claim 1, wherein the two or more interconnected switches are interconnected with an inter-switch link.

10. An apparatus comprising:
  an optimal path module configured to identify, for each port of a plurality of ports of a storage controller of a data system, an optimal path between a port of the storage controller to a computer and to identify a port of the computer connected to the optimal path, the data system comprising the computer, the storage controller, and two or more switches connecting the computer and the storage controller;
  a static address module configured to assign a static internet protocol ("IP") address to each port of the storage controller; and
  an optimal path transmission module configured to transmit to the computer, for each port of the storage controller, a static media access control ("MAC") address of the identified port of the storage controller and the corresponding port of the computer that is part of the optimal path between the port of the storage controller and the computer,
  wherein each port of the storage controller comprises a static IP address and a corresponding static MAC address,
  wherein the computer uses the static MAC addresses of the identified ports of the storage controller and the corresponding ports of the computer to create a static map, the computer uses the static map to determine which port of the computer to use to service a storage request for a particular port of the storage controller,
  wherein the static IP address of each port of the storage controller and the corresponding MAC address remain fixed to simplify maintenance of the static map, and
  wherein said modules comprise hardware circuits, a programmable hardware device, and/or program code, the program code stored on a non-transitory computer readable storage media.

11. The apparatus of claim 10, wherein:
  the storage controller is an active storage controller and the data system comprises a passive storage controller; and
  the optimal path module is further configured to identify, for each port of the passive storage controller, an optimal path from a port of the passive storage controller to the computer and to identify a port of the computer connected to the optimal path, and
  further comprising:
    a switch module configured to, in response to determining that the active storage controller is unavailable, transfer, for each port of the active storage controller, the static IP address of a port of the active storage controller to a corresponding port of the passive storage controller, wherein the passive storage controller becomes a new active storage controller; and
    the optimal path transmission module is further configured to, in response to determining that the active storage controller is unavailable, transmit to the computer, for each port of the new active storage controller, a static MAC address of the identified port of the new active storage controller and the corresponding port of the computer that is part of the optimal path between the port of the new active storage controller and the computer,
  wherein the computer uses static MAC addresses of the identified ports of the new active storage controller and the corresponding ports of the computer to revise the static map, the computer uses the static map to determine which port of the computer to use to service a storage request for a particular port of the new active storage controller.

12. The apparatus of claim 11, wherein the switch module is further configured to assign to each of the ports of the active storage controller a virtual IP address linked to the static IP address of the active storage controller and wherein the static address module is further configured to assign to each of the ports of the passive storage controller a static IP address and, in response to determining that the active storage controller is unavailable, the switch module replaces, for each port of the passive storage controller, a static IP address of a port with the static IP address and corresponding virtual IP address of the corresponding port of the active storage controller.

13. The apparatus of claim 11, further comprising an active selection module configured to select a storage controller of the data system to be the active storage controller and a different storage controller of the data system to be the passive storage controller.

14. The apparatus of claim 10, wherein two or more ports of the computer are assigned to a link aggregation group ("LAG") and wherein each of the two or more switches comprises a connection to a port of the computer.

15. The apparatus of claim 14, wherein ports of the LAG on the computer are controlled by a link aggregation control protocol ("LACP") and the LACP uses the static map to determine which port of the computer to use to communicate with the storage controller to service a storage request instead of LACP determining of which port of the computer to send data to the storage controller for servicing the storage request.

16. The apparatus of claim 10, further comprising a learning disable module configured to disable dynamic determination of IP addresses of the ports of the storage controller in conjunction with assigning the static IP addresses.

17. A method comprising:
receiving at a computer, for each port of a plurality of ports of a storage controller, a static media access control ("MAC") address of a port of the storage controller and a corresponding port of the computer, the port of the computer connected to an optimal path from the port of the computer to the port of the storage controller, the computer and the storage controller connected through two or more switches, wherein each port of the storage controller is assigned a static internet protocol ("IP") address;
creating a static map comprising, for each port of the storage controller, a mapping between the static MAC address of a particular port of the storage controller and the corresponding port of the computer that is part of the optimal path between the particular port of the storage controller and the computer; and
in response to a storage request involving data storage controlled by the storage controller, the storage request identifying an IP address of a particular port of the storage controller to service the storage request:
identifying the static MAC address associated with the IP address of the particular port of the storage controller;
reading the static map to identify the port of the computer connected to the optimal path for the particular port of the storage controller; and
servicing the storage request using the port of the computer connected to the optimal path.

18. The method of claim 17, wherein the storage controller is an active storage controller and further comprising a passive storage controller and further comprising, in response to the passive storage controller becoming a new active storage controller:
receiving at the computer, for each port of the new active storage controller, a static MAC address of a port of the new active storage controller and a corresponding port of the computer, the port of the computer connected to an optimal path from the port of the computer to the port of the new active storage controller, the computer and the new active storage controller connected through the two or more switches, wherein each port of the new active storage controller is assigned a static IP address transferred from the previous active storage controller;
creating a revised static map for each port of the new active storage controller, the revised static map comprising a mapping between the static MAC address of a particular port of the new active storage controller and the corresponding port of the computer that is part of the optimal path between the particular port of the new active storage controller and the computer; and
in response to a storage request involving data storage controlled by the new active storage controller, the storage request identifying an IP address of a particular port of the new active storage controller to service the storage request:
identifying the static MAC address associated with the IP address of the particular port of the new active storage controller;
reading the static map to identify the port of the computer connected to the optimal path for the particular port of the new active storage controller; and
servicing the storage request using the port of the computer connected to the optimal path.

19. The method of claim 18, wherein, in response to determining that the active storage controller is unavailable, for each port of the passive storage controller, a static IP address of a port is replaced with the static IP address and corresponding virtual IP address of the corresponding port of the active storage controller and further comprising receiving for each static MAC address a corresponding static IP address newly assigned to the passive storage controller, which is the new active storage controller.

20. The method of claim 17, wherein two or more ports of the computer are assigned to a link aggregation group ("LAG") and wherein each of the two or more switches comprises a connection to a port of the computer, and wherein ports of the LAG on the computer are controlled by a link aggregation control protocol ("LACP") and further comprising, in response to a storage request, directing the LACP to use the static map to determine which port of the computer to use to communicate with the storage controller while servicing the storage request.

* * * * *